(12) United States Patent
Takatsu et al.

(10) Patent No.: US 10,177,591 B2
(45) Date of Patent: Jan. 8, 2019

(54) POWER-TRANSMITTING DEVICE AND WIRELESS POWER TRANSMISSION SYSTEM

(71) Applicant: IHI CORPORATION, Tokyo (JP)

(72) Inventors: Yuji Takatsu, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 269 days.

(21) Appl. No.: 15/236,540

(22) Filed: Aug. 15, 2016

(65) Prior Publication Data

US 2016/0352139 A1 Dec. 1, 2016

Related U.S. Application Data

(63) Continuation of application No. PCT/JP2015/057305, filed on Mar. 12, 2015.

(30) Foreign Application Priority Data

Mar. 18, 2014 (JP) .................................. 2014-055053
Apr. 11, 2014 (JP) .................................. 2014-081973

(51) Int. Cl.
*H02J 7/00* (2006.01)
*H02J 7/02* (2016.01)
*H02J 7/04* (2006.01)
*H02J 50/10* (2016.01)
*H02J 50/12* (2016.01)
*H02J 50/80* (2016.01)

(52) U.S. Cl.
CPC .............. *H02J 7/025* (2013.01); *H02J 7/045* (2013.01); *H02J 50/10* (2016.02); *H02J 50/12* (2016.02); *H02J 50/80* (2016.02); *H02J 2007/0059* (2013.01); *H02J 2007/0096* (2013.01)

(58) Field of Classification Search
CPC ....................................................... H02J 7/025
USPC ......................................................... 320/108
See application file for complete search history.

(56) References Cited

U.S. PATENT DOCUMENTS

| 6,016,046 A   | * | 1/2000 | Kaite  | H01M 10/46 |
|---|---|---|---|---|
|               |   |        |        | 320/108 |
| 7,109,682 B2  | * | 9/2006 | Takagi | H02J 7/0054 |
|               |   |        |        | 320/108 |
| 8,947,041 B2  | * | 2/2015 | Cook   | G06K 7/0008 |
|               |   |        |        | 320/108 |
| 2002/0089305 A1 | * | 7/2002 | Park | H02J 50/10 |
|               |   |        |        | 320/108 |

(Continued)

FOREIGN PATENT DOCUMENTS

| EP | 2685601 A2 | 1/2014 |
|---|---|---|
| EP | 3021451 A1 | 5/2016 |

(Continued)

*Primary Examiner* — Yalkew Fantu
(74) *Attorney, Agent, or Firm* — Volpe and Koenig, P.C.

(57) ABSTRACT

A power-transmitting device transmits AC power generated in an inverter circuit to a power receiving device in a wireless manner by magnetically coupling a power-transmitting coil to a power-receiving coil of the power receiving device. The power-transmitting device is provided with a power transmission controller which controls the aforementioned inverter circuit to change the AC power in accordance with information relating to the state of power transmission to a load connected to the power-receiving device.

13 Claims, 3 Drawing Sheets

(56) References Cited

U.S. PATENT DOCUMENTS

2008/0303479 A1 12/2008 Park et al.
2013/0002192 A1 1/2013 Fischbach et al.
2014/0306650 A1 10/2014 Akiyoshi et al.
2015/0326035 A1 11/2015 Murayama

FOREIGN PATENT DOCUMENTS

| JP | 2004-064938 A | 2/2004 |
| JP | 2005-006396 A | 1/2005 |
| JP | 2009-504116 A | 1/2009 |
| JP | 2013-070581 A | 4/2013 |
| JP | 2013-110784 A | 6/2013 |
| JP | 2013-179723 A | 9/2013 |
| JP | 2013-183496 A | 9/2013 |
| JP | 2013-198260 A | 9/2013 |
| WO | 2013/094464 A1 | 6/2013 |
| WO | 2014/148144 A1 | 9/2014 |

* cited by examiner

POWER-TRANSMITTING DEVICE AND WIRELESS POWER TRANSMISSION SYSTEM

This application is a Continuation of International Application No. PCT/JP2015/057305, filed on Mar. 12, 2015, claiming priority based on Japanese Patent Application No. 2014-055053, filed on Mar. 18, 2014, and Japanese Patent Application No. 2014-081973, filed on Apr. 11, 2014, the contents of which are incorporated herein by reference in their entirety.

TECHNICAL FIELD

Embodiments described herein relates to a power-transmitting device and a wireless power transmission system.

BACKGROUND ART

Systems (wireless power transmission systems) that transmits power in a wireless manner from the ground to movable bodies (such as vehicles) have recently been studied. Patent Document 1 discloses a device in which a power-transmitting coil of a power-transmitting device that is provided on the ground and a power-receiving coil of a power-receiving device that is provided on a vehicle face each other and a battery (secondary battery) is charged, via a charging circuit, with power wirelessly transmitted from the power-transmitting coil to the power-receiving coil. In this device, a DC-DC converter is provided in the power-receiving device such that an input (current, voltage, or power) to the battery is controlled. For example, this DC-DC converter allows the charging of the battery to be controlled by the charging circuit initially based on a constant current (CC) charging type. After some progress of the charging, that is, after the state of charging (SOC: State Of Charge) of the battery has risen to some extent, the DC-DC converter controls the charging type to switch from the CC charging type to a constant voltage (CV) charging type. Thus, the input (current or power) to the battery can be reduced and the battery is charged until reaching a fully-charged state (SOC=100%).

CITATION LIST

Patent Document

[Patent Document 1] Japanese Unexamined Patent Application, First Publication No. 2013-110784

SUMMARY

Technical Problem

In the device according to the related art, the DC/DC converter that adjusts the charging of (power transmission to) the battery is provided in the power-receiving device while the facility on the movable body is required to have, for example, a minimum mounting area and a minimum mounting weight, unlike the facility on the ground, in view of the degree of freedom of the installation location. Accordingly, the elements that constitute the movable body side device need to be curtailed.

The present disclosure is made in view of the above-described circumstances, and an object thereof is to adjust power transmission to a load even when a power-receiving device does not have a function for adjusting power transmitted to the load.

Solution to Problem

In a first aspect of the present disclosure, a power-transmitting device transmitting AC power generated in an inverter circuit to a power-receiving device in a wireless manner by magnetically coupling a power-transmitting coil to a power-receiving coil of the power-receiving device, includes a power transmission controller controlling the inverter circuit so as to change the AC power in accordance with information relating to a state of power transmission to a load connected to the power receiving device.

A second aspect of the present disclosure further includes an acquisition unit acquiring the information from the power-receiving device.

In a third aspect of the present disclosure, the load is a secondary battery, the acquisition unit acquires, as the information, an instruction to reduce the power transmission to the secondary battery, and the power transmission controller changes the AC power according to the information.

In a fourth aspect of the present disclosure, the load is a secondary battery, and the power transmission controller determines a timing of a reduction in the power transmission to the secondary battery based on the information and changes the AC power according to a result of the determination.

In a fifth aspect of the present disclosure, the acquisition unit acquires the information once after the transmission of the AC power is initiated, the power-transmitting device includes a storage unit in which a relationship between a charging time of the secondary battery and the information is stored in advance, and the power transmission controller determines the timing of the reduction in the power transmission to the secondary battery according to the relationship and the information.

In a sixth aspect of the present disclosure, the storage unit stores a relationship between the charging time and charging power of the secondary battery for each of secondary batteries having different characteristics.

In a seventh aspect of the present disclosure, the information is a charging voltage or impedance of the secondary battery.

In an eighth aspect of the present disclosure, the load is a secondary battery, the power-transmitting device includes a storage unit in which a relationship between impedance of the load and a timing of a change in the AC power is stored, and the power transmission controller identifies the impedance of the load according to an input current and an input voltage of the inverter circuit or an output current and an output voltage of the inverter circuit and changes the AC power according to the identified impedance and the relationship.

In a ninth aspect of the present disclosure, the power transmission controller controls the inverter circuit such that a phase difference between the output current and the output voltage of the inverter circuit increases as a charging state of the secondary battery becomes close to a fully-charged state.

In a tenth aspect of the present disclosure, the power transmission controller adjusts a switching frequency of the inverter circuit.

In an eleventh aspect of the present disclosure, the power transmission controller adjusts an ON/OFF duty ratio of the inverter circuit.

In a twelfth aspect of the present disclosure, the power transmission controller adjusts a switching phase difference between two legs where two switching elements in the inverter circuit are connected in series.

A thirteenth aspect of the present disclosure includes the power transmission device and the power-receiving device.

In a fourteenth aspect of the present disclosure, the power receiving device has a power-receiving rectifier circuit rectifying the AC power received from the power-transmitting coil by the power-receiving coil and transmitting the rectified AC power to the secondary battery as the load, and a provider providing the power-transmitting device with the information relating to the state of the power transmission.

According to the present disclosure, the power-transmitting device adjusts the amount of AC power transmission by setting the frequency of the AC power, that is, the power-transmitting device is also provided with a function for adjusting the power transmitted to the load. Accordingly, the power-receiving device does not have to be provided with the adjustment function. Therefore, according to the present disclosure, the power transmission to the load can be adjusted even if the power receiving device does not have the function for adjusting the power transmitted to the load.

DESCRIPTION OF EMBODIMENTS

Hereinafter, an embodiment of the present disclosure will be described with reference to the accompanying drawings.

Figure 1:
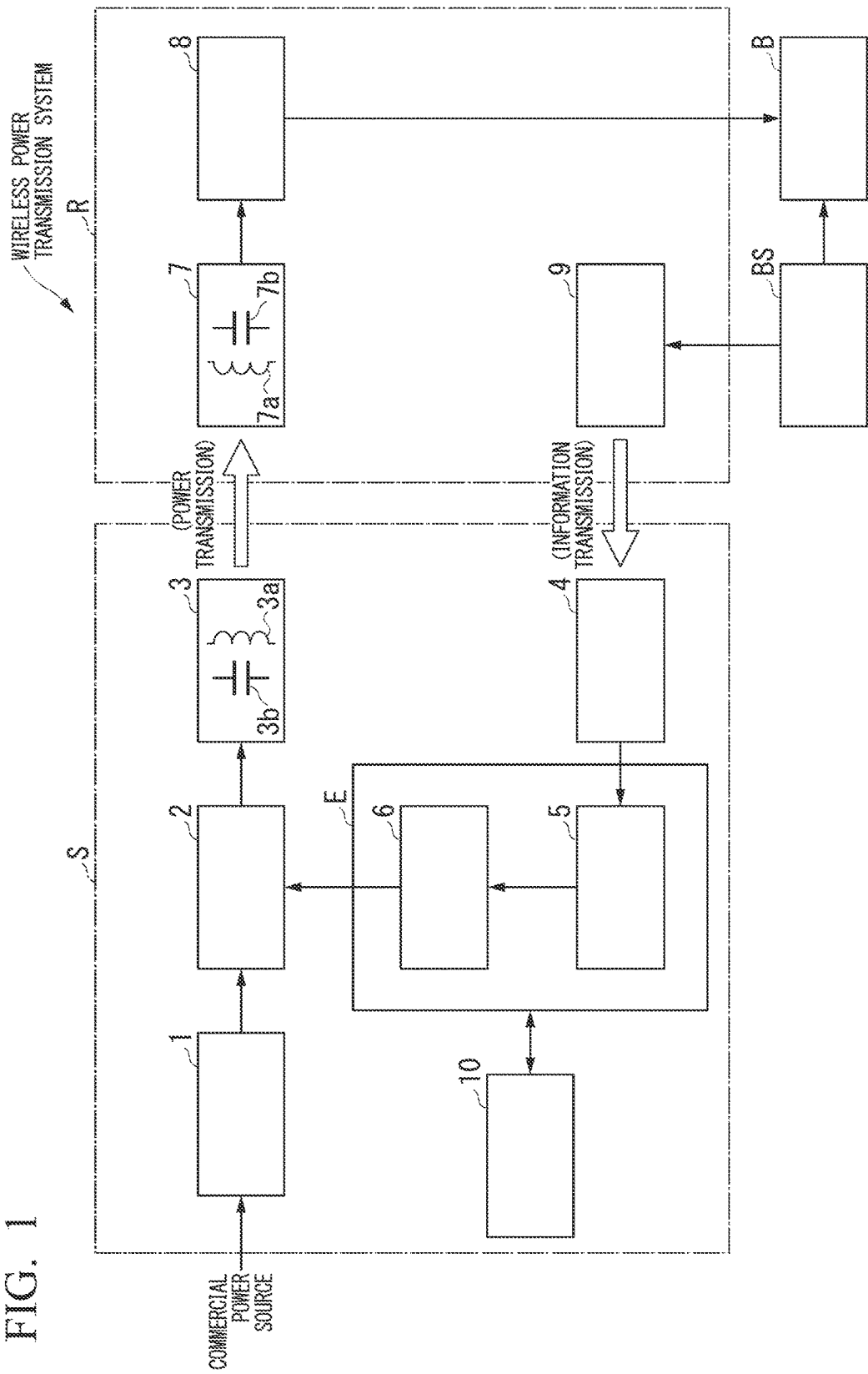
FIG. 1 is a block diagram showing a functional configuration of a wireless power transmission system according to an embodiment of the present disclosure.

As shown in FIG. 1, a power-transmitting device S and a power-receiving device R constitute a wireless power transmission system according to the embodiment. As shown in the drawing, a power-transmitting rectifier circuit 1, an inverter circuit 2, a power-transmitting resonance circuit 3, a power-transmitting communication unit 4 (acquisition unit), a switching frequency setting unit 5, a switching controller 6, and a storage unit 10 constitute the power-transmitting device S.

Among the components that constitute the power-transmitting device S, the switching frequency setting unit 5 and the switching controller 6 constitute a power transmission controller E. The power transmission controller E is configured to have, for example, any appropriate processor such as a central processing unit (CPU) and a dedicated processor specialized for each processing (such as a digital signal processor (DSP)). The storage unit 10 is a volatile storage medium such as a random access memory (RAM) or a non-volatile storage medium such as a read-only memory (ROM) storing various types of information such as a table (described later) and programs describing respective functions of the power transmission controller E.

A power-receiving resonance circuit 7, a power-receiving rectifier circuit 8, and a power-receiving communication unit 9 (provider) constitute the power-receiving device R. A battery B shown in FIG. 1 is a load (power transmission target) of the power-receiving device R and a secondary battery that is capable of power charging and discharging.

The power-transmitting device S is placed to be fixed to a power transmission facility provided on the ground and transmits AC power in a wireless manner to the power-receiving device R provided in a movable body. The power transmission facility is a facility where a parking space or a plurality of parking spaces for the movable body are provided. The power transmission facility is provided with the power-transmitting devices S equivalent to the number of the parking spaces. The power-receiving device R provided in the movable body is a device that transmits DC power to the battery B and charges the battery B by converting the AC power supplied from the power-transmitting device S to the DC power. The movable body described above is a vehicle that may require power reception from outside such as an electric vehicle and a hybrid vehicle.

The power-transmitting rectifier circuit 1 in the power-transmitting device S is, for example, a diode bridge. The power-transmitting rectifier circuit 1 converts commercial power (for example, single-phase 100 volts and 50 Hz) supplied from an external commercial power source to DC power by full-wave rectification and outputs the DC power to the inverter circuit 2. This DC power is a pulsating flow that has a single polarity (such as a positive polarity) with a sinusoidal commercial power folded back at a zero-cross point.

The inverter circuit 2 is a power conversion circuit that converts DC power transmitted from the power-transmitting rectifier circuit 1 to AC power based on a switching signal (inverter driving signal) input from the switching controller 6. In other words, the inverter circuit 2 switches DC power at a predetermined frequency (switching frequency f) and converts the DC power to AC power at the switching frequency f by driving a plurality of switching transistors by the inverter driving signal. The inverter circuit 2 outputs the AC power at the switching frequency f to the power-transmitting resonance circuit 3.

The power-transmitting resonance circuit 3 is a resonance circuit that has a power-transmitting coil 3a and a power-transmitting capacitor 3b. Of these power-transmitting coil 3a and power-transmitting capacitor 3b, the power-transmitting coil 3a is provided at a position that faces a predetermined place of the movable body parked in the above-described parking space (a place where a power-receiving coil 7a (described later) is provided). The power-transmitting resonance circuit 3 transmits the AC power received from the inverter circuit 2 to a power-receiving resonance circuit 7 by inter-coil magnetic coupling.

A resonance frequency of the wireless power transmission system is a value that is determined based on circuit constants of the power-transmitting resonance circuit 3 and the power-receiving resonance circuit 7 (described later) (values of the power-transmitting coil 3a, the power-transmitting capacitor 3b, the power-receiving coil 7a, and a power-receiving capacitor 7b). In the embodiment, the resonance frequency is equal to the driving frequency (steady-state switching frequency $f_0$) at a time of steady-state power transmission of the power-transmitting device S.

A power factor of the AC power of the switching frequency f that is transmitted from the inverter circuit 2 to the power-transmitting resonance circuit 3, that is, a phase difference between an output voltage and an output current from the inverter circuit 2, changes depending on circuit characteristics of the power-transmitting resonance circuit 3 and the power-receiving resonance circuit 7. In a case where the switching frequency f is equal to the resonance frequency, the power factor of the AC power from the inverter circuit 2 is "1", that is, the phase difference between the output voltage and the output current from the inverter circuit 2 is "zero". As the switching frequency f becomes apart from the resonance frequency, the phase difference between the output voltage and the output current from the inverter circuit 2 increases. As the phase difference between the output voltage and the output current from the inverter circuit 2 increases (that is, as the power factor decreases), the current that is transmitted to the power-receiving resonance circuit 7 (input current to the battery B) decreases.

The switching frequency f and the resonance frequency being equal to each other is not limited to both completely corresponding to each other in a strict sense. For example, the switching frequency f and the resonance frequency can be considered to be equal to each other when within an error range which is set in advance.

The power-transmitting communication unit 4 acquires information on a power-receiving side (power-receiving side information) from a power-receiving communication unit 9 by performing near-field communication with the power-receiving communication unit 9 of the power-receiving device R. The power-receiving side information is information relating to the state of power transmission to the battery B. For example, the power-receiving side information is a charging current, a charging voltage, or charging power to the battery B or a charging rate (SOC: state of charge) or impedance of the battery B. The power-transmitting communication unit 4 outputs, to the switching frequency setting unit 5, the power-receiving side information acquired from the power-receiving communication unit 9. The type of communication between the power-transmitting communication unit 4 and the power-receiving communication unit 9 is near-field communication such as ZigBee (registered trademark) and Bluetooth (registered trademark) or short-distance optical communication using an optical signal.

The switching frequency setting unit 5 appropriately sets the switching frequency f based on the power-receiving side information input from the power-transmitting communication unit 4. For example, the switching frequency setting unit 5 sets the switching frequency f by referring to the table (frequency control table) in which a relationship between the charging rate (SOC) and the switching frequency f is registered in the storage unit 10 as a plurality of data.

The switching frequency setting unit 5 outputs, to the switching controller 6, a setting value of the switching frequency f (switching frequency setting value) in accordance with the charging rate (SOC). The frequency control table may be a table defining a relationship between the charging voltage and the switching frequency f, a relationship between the charging power and the switching frequency f, or a relationship between the impedance of the battery B and the switching frequency f instead of the table defining the relationship between the charging rate (SOC) and the switching frequency f.

Figure 2:
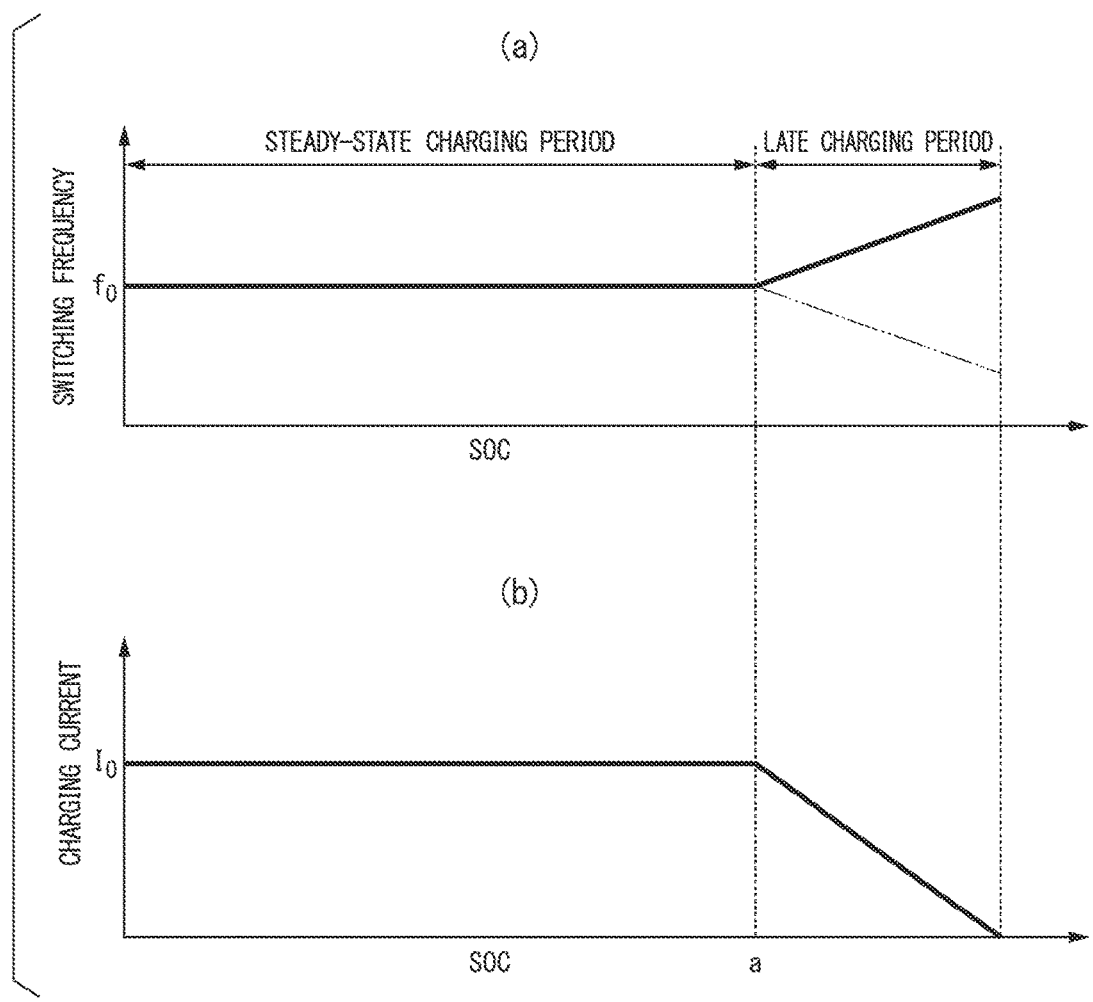
FIG. 2 is a characteristic diagram showing an operation of a wireless power transmission system according to an embodiment of the present disclosure.

Herein, the frequency control table defines the relationship between the charging rate (SOC) and the switching frequency f as shown in (a) of FIG. 2. In other words, the frequency control table sets the switching frequency f to the steady-state switching frequency $f_0$ in a state where the charging rate (SOC) is lower than a predetermined threshold a and linearly increases the switching frequency f as the charging rate (SOC) increases once the charging rate (SOC) reaches the threshold a.

In other words, the frequency control table defines that the switching frequency f is set to the steady-state switching frequency $f_0$ in a steady-state charging period in which the charging rate (SOC) is lower than the predetermined threshold a and the switching frequency f is subjected to a transition to gradually increase from the steady-state switching frequency $f_0$ in a late charging period in which the charging rate (SOC) is greater than or equal to the threshold a.

(b) of FIG. 2 is a characteristic diagram showing a change in the charging current corresponding to this change in the switching frequency f. It is apparent in this characteristic diagram that, in the late charging period described above, the charging current gradually falls from a steady-state charging current $I_0$ (charging current at a time of the steady-state switching frequency $f_0$) and finally approaches "zero" by the switching frequency f being subjected to the transition to gradually increase from the steady-state switching frequency $f_0$. This change in the charging current is attributable to a reduction in the amount of power of the AC power from the power-transmitting coil 3a of the power-transmitting resonance circuit 3 to the power-receiving coil 7a of the power-receiving resonance circuit 7. Accordingly, the frequency control table sets the switching frequency f such that the power transmitted from the power-transmitting coil 3a to the power-receiving coil 7a falls short of the power transmitted at the steady-state switching frequency $f_0$ in the late charging period.

The switching controller 6 generates a pulse width modulation (PWM) signal based on the switching frequency setting value input from the switching frequency setting unit 5. In other words, the switching controller 6 generates a PWM signal that has a repetition frequency corresponding to the switching frequency setting value and a constant duty ratio and outputs the PWM signal to the inverter circuit 2 as the inverter driving signal.

The power-receiving resonance circuit 7 in the power-receiving device R is a resonance circuit that has the power-receiving coil 7a and the power-receiving capacitor 7b. The power-receiving coil 7a is provided in a bottom portion, a side portion, an upper portion, or the like of the movable body. In a case where the movable body parks in the parking space, the power-receiving coil 7a faces the power-transmitting coil 3a that constitutes the power-transmitting device S in a state of close proximity.

The power-receiving coil 7a of the power-receiving resonance circuit 7 is magnetically coupled to and faces in close proximity the power-transmitting coil 3a that constitutes the power-transmitting resonance circuit 3. In other words, the power-receiving resonance circuit 7 receives the AC power transmitted to the power-transmitting coil 3a by the inverter circuit 2 and the AC power space-transmitted in accordance with a coupling coefficient of the power-transmitting coil 3a and the power-receiving coil 7a and outputs those to the power-receiving rectifier circuit 8. In other words, the wireless power transmission system is a wireless power transmission system complying with a magnetic field resonance method.

The power-receiving rectifier circuit 8 is configured to have, for example, a diode bridge, a reactor, and a smoothing capacitor. The power-receiving rectifier circuit 8 causes the AC power transmitted from the power-receiving resonance circuit 7 (received power) to turn into DC power by full-wave rectification and smoothing and charges the battery B with the DC power by outputting the DC power to the battery B. The power (charging power) that is transmitted to the battery B from the power-receiving rectifier circuit 8 is DC power obtained by the reactor and the smoothing capacitor smoothing the full-wave rectification power resulting from the full-wave rectification by the diode bridge.

The power-receiving communication unit 9 wirelessly transmits the power-receiving side information to the power-transmitting communication unit 4 of the power-transmitting device S. In other words, the power-receiving communication unit 9 performs near-field communication with the power-transmitting communication unit 4 and, as is the case of the power-transmitting communication unit 4, performs radio communication such as ZigBee (registered trademark) and Bluetooth (registered trademark) or optical communication using an optical signal.

The battery B is a secondary battery such as a lithium-ion battery. The battery B is charged with and stores the DC power that is transmitted from the power-receiving rectifier circuit 8. The battery B is connected to an inverter driving a traction motor of the movable body (inverter for traveling) and/or a control instrument controlling traveling of the movable body, and transmits driving power to the inverter for traveling and the control instrument while being controlled by a battery controller BS which is a part of the control instrument. The battery controller BS acquires the power-receiving side information, such as the charging voltage, the charging power, and the charging rate to the battery B, by monitoring the battery B. Then, the battery controller BS sends the power-receiving side information to the power-receiving communication unit 9.

Hereinafter, an operation of the wireless power transmission system configured as described above will be described in detail with reference to FIG. 2.

In the wireless power transmission system, when the movable body enters the parking space, the power-transmitting device S initiates power transmission to the power-receiving device R of the movable body. For example, the power-transmitting communication unit 4 of the power-transmitting device S continuously transmits a communication request signal at a constant cycle and the power-receiving communication unit 9 of the power-receiving device R, which becomes capable of receiving the communication request signal when the movable body enters the parking space, transmits a response signal to the power-transmitting communication unit 4 in response to the communication request signal. Upon receiving the response signal, the power-transmitting communication unit 4 notifies the switching controller 6 of the reception of the response signal via the switching frequency setting unit 5. As a result, the switching controller 6 determines (recognizes) that the movable body has entered an area where the power can be transmitted.

Then, the switching controller 6 transmits a transmission request for information regarding the state of power transmission to the battery B from the power-transmitting communication unit 4 to the power-receiving communication unit 9 via the switching frequency setting unit 5 and acquires the charging rate (SOC) of the battery B as the power-receiving side information. In other words, upon receiving the transmission request, the power-receiving communication unit 9 captures the charging rate (SOC) of the battery B from the battery controller BS and transmits the charging rate (SOC) of the battery B to the power-transmitting communication unit 4. Then, the power-transmitting communication unit 4 outputs the charging rate (SOC) received from the power-receiving communication unit 9 to the switching frequency setting unit 5. Then, the switching frequency setting unit 5 acquires the switching frequency setting value in accordance with the charging rate (SOC) and outputs the switching frequency setting value to the switching controller 6.

With the switching frequency setting value acquired in this manner, the switching controller 6 allows the inverter circuit 2 to initiate AC power generation by initiating PWM signal generation. In other words, the switching controller 6 generates the PWM signal of the repetition frequency in accordance with the switching frequency setting value and the constant duty ratio set in advance and outputs the PWM signal to the inverter circuit 2, and the inverter circuit 2 generates the AC power of the switching frequency f corresponding to the switching frequency setting value based on the PWM signal and outputs the AC power to the power-transmitting resonance circuit 3.

As a result, the AC power of the switching frequency f is wirelessly transmitted from the power-transmitting coil 3a of the power-transmitting resonance circuit 3 to the power-receiving coil 7a of the power-receiving resonance circuit 7 and is converted (rectified) to DC power by being input from the power-transmitting resonance circuit 3 to the power-receiving rectifier circuit 8. Then, the DC power is transmitted from the power-receiving rectifier circuit 8 to the battery B and the battery B is charged with the DC power. As a result of this charging, the charging rate (SOC) of the battery B becomes higher than in a state preceding the initiation of the charging.

This rise in the charging rate (SOC) is measured by the charging voltage being monitored by the battery controller BS, transmitted from the battery controller BS to the power-transmitting communication unit 4 through the power-receiving communication unit 9, and transmitted from the power-transmitting communication unit 4 to the switching frequency setting unit 5 to cause the switching frequency f to be updated.

Although the charging rate (SOC) of the battery B gradually rises through the wireless power transmission from the power-transmitting device S to the power-receiving device R, the switching frequency setting unit 5 sets the switching frequency f to the steady-state switching frequency $f_0$ in the state where the charging rate (SOC) is lower than the threshold a (steady-state charging period) and linearly increases the switching frequency f with the increase in the charging rate (SOC) in the late charging period subsequent to the arrival of the charging rate (SOC) at the threshold a as shown in (a) of FIG. 2.

Since the steady-state switching frequency $f_0$ is set to be equal to the resonance frequency of the wireless power transmission system, the steady-state switching frequency $f_0$ is the switching frequency f at which the power factor of the output voltage and the output current from the inverter circuit 2 is maximized, that is, at which the power factor becomes "1". In other words, the steady-state charging period is a charging period in which the AC power transmission is maximized. In contrast, the late charging period is a period in which the switching frequency f is subjected to the transition to gradually increase from the resonance frequency of the power-transmitting resonance circuit 3 and the power-receiving resonance circuit 7 (that is, the steady-state switching frequency $f_0$) with the increase in the charging rate (SOC). Accordingly, the late charging period is a charging period in which the amount of the AC power (power factor) gradually falls and the charging current approaches "zero" in the end.

According to this embodiment, the power-transmitting device S regulates the amount of transmission of the AC power by setting the frequency of the AC power. In other words, the power-transmitting device S regulates the amount of power of the AC power by changing the switching frequency f of the AC power. Because the power-transmitting device S is also provided with a charging current adjustment function, the power-receiving device R does not have to be provided with the charging current adjustment function as in a DC-DC converter according to the related art. Therefore, according to this embodiment, the power transmission to the battery B can be adjusted even if the power-receiving device R is not given an adjustment function regarding the power transmitted to the battery B (DC-DC converter or the like).

In addition, according to this embodiment, the switching frequency f is changed with the charging rate (SOC) that changes from moment to moment after the initiation of the power transmission being sequentially acquired from the power-receiving device R, and thus the charging of the battery B can be controlled in real time and in a precise manner.

The present disclosure is not limited to the embodiment described above. For example, the following modification examples are also conceivable.

(1) In the embodiment described above, the switching frequency f linearly and gradually increases from the steady-state switching frequency $f_o$, with the increase in the charging rate (SOC), in the late charging period. However, the present disclosure is not limited thereto. For example, the switching frequency f may linearly and gradually decrease from the steady-state switching frequency $f_o$, as shown by the two-dot chain line in (a) of FIG. 2, as the charging rate (SOC) increases. In addition, the switching frequency f may change in stages and in a stepwise manner instead of undergoing the linear and gradual transition.

(2) Regarding the method for estimating the information related to the state of power transmission to the battery B (load), the switching frequency setting unit 5 may sequentially estimate the charging rate, the impedance, the charging voltage, or the like of the battery B (load) based on the output current and the output voltage of the power-transmitting rectifier circuit 1 or the inverter circuit 2. In this case, a control table showing a relationship between the charging rate, the impedance, the charging voltage, or the like and the switching frequency f is stored in advance in the storage unit 10.

The switching frequency setting unit 5 sets the switching frequency f by sequentially searching for the switching frequency f corresponding to an estimated value of the impedance in the control table. Then, the switching frequency setting unit 5 changes the switching frequency f once the estimated value of the impedance becomes greater than or equal to an impedance corresponding to the threshold a in FIG. 2. In this case, the information related to the state of power transmission to the battery B can be estimated with the power-transmitting device side information alone, and thus the power-transmitting device S does not have to acquire the power-receiving side information from the power-receiving device R. Therefore, communication may not be required between the power-transmitting device S and the power-receiving device R, and thus the power-transmitting communication unit 4 (acquisition unit) and the power-receiving communication unit 9 can be omitted, which allows the configuration of each device to be simplified.

(3) In the embodiment described above, the charging current, the charging voltage, the charging power, the charging rate (SOC), or the impedance of the battery B that changes from time to time after the initiation of the power transmission is sequentially acquired as the power-receiving side information. However, the present disclosure is not limited thereto. For example, a control table showing a relationship between a charging time and the charging rate (SOC) of the battery B is stored in advance in the storage unit 10 and the switching frequency setting unit 5 acquires the power-receiving side information only once in an early stage subsequent to the initiation of the power transmission.

Based on the acquired power-receiving side information and the control table, the switching frequency setting unit 5 can predict how long the current charging should continue for the charging rate to become greater than or equal to the threshold a shown in FIG. 2. The switching frequency setting unit 5 also can change the switching frequency f at a predicted timing. In this case, the power-transmitting communication unit 4 and the power-receiving communication unit 9 do not have to repeat intercommunication, and thus communication loads of the power-transmitting communication unit 4 and the power-receiving communication unit 9 can be reduced.

(4) In the embodiment described above, the power-transmitting communication unit 4 acquires the charging current, the charging voltage, the charging power, the charging rate (SOC), or the impedance of the battery B as the power-receiving side information. However, the present disclosure is not limited thereto. For example, an instruction to reduce the power transmission to the battery B (secondary battery) may be acquired as the power-receiving side information instead of the charging current, the charging voltage, the charging power, the charging rate (SOC), or the impedance.

In this case, the battery controller BS determines that the power transmission to the battery B is to be reduced when the charging rate (SOC), the impedance of the battery B, or the charging voltage exceeds a predetermined threshold. As a result, the battery controller BS outputs the instruction so as to reduce the power transmission to the battery B to the power-receiving communication unit 9. Then, the power-receiving communication unit 9 transmits the instruction to the power-transmitting communication unit 4. Then, the switching frequency setting unit 5 changes the switching frequency f in accordance with the power-receiving side information input from the power-transmitting communication unit 4.

In a case where the power-transmitting communication unit 4 acquires the instruction, a load of the switching frequency setting unit 5 is reduced because the battery controller BS has the right to make a decision on whether to change the switching frequency f or not. In addition, in a case where the power-receiving device R is mounted in the vehicle, since the vehicle is provided with a highly-functional calculation processing device such as an engine control unit (ECU), the battery controller BS can be realized in the calculation processing device. As the calculation processing device of the vehicle determines the power transmission reduction timing, the processing capacity of the device can be effectively utilized.

(5) In the embodiment described above, the frequency control table showing the relationship between the charging rate (SOC) of the battery B and the switching frequency f is used. However, a charging control responding to a plurality of types of the batteries B can also be realized by data showing the relationship between the charging rate (SOC) and the switching frequency f being stored for each of the plurality of types of the batteries B that have different characteristics.

Figure 3:
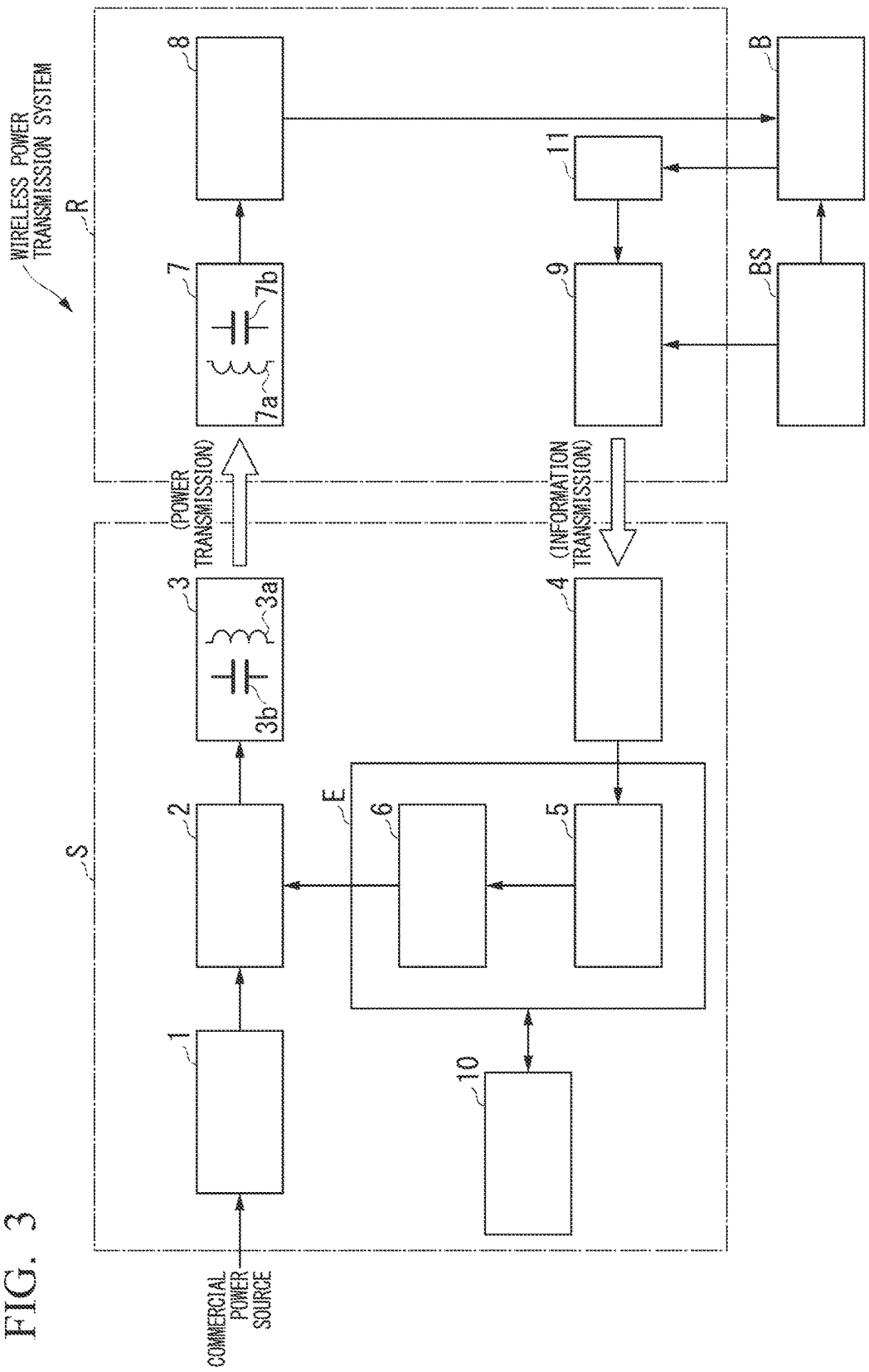
FIG. 3 is a block diagram showing a functional configuration of a wireless power transmission system according to a modification example of the present disclosure.

(6) In the embodiment described above, the power-receiving communication unit 9 acquires the power-receiving side information from the battery controller BS. However, the present disclosure is not limited thereto. As shown in FIG. 3, a functional unit (measurement unit) 11 that measures the power-receiving side information such as the charging voltage and the charging power of the battery B and generates the power-receiving side information may be newly provided in the power-receiving device R and the power-receiving side information generated by the functional unit 11 may be acquired by the power-receiving communication unit 9 via the power-receiving communication unit 9. Then, a control for the battery B to be fully charged is realized even if the battery B is an inexpensive battery not coming with the battery controller BS. The measurement unit 11 is, for example, a voltage sensor that measures the charging voltage. In addition, the measurement unit 11 is configured to have, for example, a voltage sensor that measures the charging voltage, a current sensor that measures the charging current, and a power calculator that measures the charging power by time-averaging values obtained by the charging voltage being multiplied by the charging current.

(7) In the embodiment described above, the steady-state switching frequency $f_0$ is equal to the resonance frequency. However, the present disclosure is not limited thereto. For example, in a case where the steady-state switching frequency $f_0$ is set, the phase difference between the output voltage and the output current from the inverter circuit 2 is present. In a case where the charging rate has reached the predetermined threshold a, the switching frequency setting unit 5 sets the switching frequency fat which the phase difference is greater than at a time of the steady-state switching frequency $f_0$. As the phase difference expands, the current input to the battery B can be suppressed.

(8) In the embodiment described above, the load is the battery B. In the present disclosure, however, the load is not limited to the battery B and includes various types of power storage devices and various types of instruments that execute predetermined functions in response to the power transmission. In this case, the placement and configuration of the capacitors 3b and 7b of the power-transmitting resonance circuit 3 and the power-receiving resonance circuit 7 may be appropriately changed.

(9) In the description of the embodiment according to the present disclosure described above, the content meant by the technical ideas of the expressions such as "reaching" the threshold, being "greater than or equal to" the threshold, and being "lower than" the threshold is not necessarily the meanings in a strict sense and includes meanings in cases where a reference value is included and not included depending on specifications of the power-transmitting device and the power-receiving device. For example, to "reach" or be "greater than or equal to" the threshold can imply a case where the comparison target exceeds the threshold as well as a case where the comparison target is greater than or equal to the threshold. To be "lower than" the threshold can imply a case where the comparison target is less than or equal to the threshold as well as a case where the comparison target is lower than the threshold.

(10) In the embodiment described above, the wireless power transmission system is a system complying with the magnetic field resonance method. However, the present disclosure is not limited to this aspect. The wireless power transmission system may be a system in which power characteristics of the power-receiving side change as a result of a change in power characteristics (frequency, duty ratio (described later), and the like) of the power-transmitting side. For example, the wireless power transmission system may be a system using an electromagnetic induction method.

(11) In the embodiment described above, the battery controller BS obtains the impedance of the battery B. However, the present disclosure is not limited to this aspect. The power transmission controller E may calculate the impedance based on the charging voltage and the charging current with the battery controller BS transmitting the charging voltage and the charging current of the battery B to the power-transmitting communication unit 4 via the power-receiving communication unit 9.

(12) In the embodiment described above, the AC power of the inverter circuit 2 is adjusted by adjusting the switching frequency f of the inverter circuit 2 so that the battery B is in a fully-charged state. However, the present disclosure is not limited thereto. For example, the AC power of the inverter circuit 2 may be adjusted (may be changed) by adjusting a switching ON/OFF duty ratio of the inverter circuit 2 so that the battery B is in the fully-charged state. The power output from the inverter circuit 2 increases as the length of switching ON time of the inverter circuit 2 increases. Accordingly, the power output from the inverter circuit 2 changes as the switching ON/OFF time changes.

For example, the power-transmitting device S can be provided with a duty ratio setting unit instead of the switching frequency setting unit 5. The duty ratio setting unit is provided with, for example, a table (duty ratio control table) in which a relationship between the charging voltage of the battery B and the switching duty ratio of the inverter circuit 2 is registered as a plurality of data and outputs, to the switching controller 6, a setting value of the duty ratio (duty ratio setting value) in accordance with the charging voltage.

In addition, the AC power of the inverter circuit 2 may be adjusted (may be changed) so that the battery B is in the fully-charged state by adjusting a switching phase difference between two legs where two switching transistors (switching elements) of the inverter circuit 2 are connected in series. Inverter circuit conduction time changes for the switching phase difference, and the power output from the inverter circuit 2 increases as the length of the conduction time increases. Accordingly, the power output from the inverter circuit 2 changes as the switching phase difference changes. For example, the power-transmitting device S is provided with a phase difference setting unit instead of the switching frequency setting unit 5. This phase difference setting unit is provided with, for example, a table (phase difference control table) in which a relationship between the charging voltage and the above-described phase difference of the inverter circuit 2 is registered as a plurality of data and outputs, to the switching controller 6, a setting value of the phase difference (phase difference setting value) in accordance with the charging voltage.

(13) In the embodiment described above, the battery controller BS acquires the charging voltage, the charging power, the charging rate, and the like to the battery B as the power-receiving side information. However, the present disclosure is not limited to this aspect. For example, the battery controller BS can calculate a power (or current) target value regarding the power transmitted from the power-transmitting device S to the power-receiving device R and output the target value to the power-receiving communication unit 9. The power (or current) target value regarding the power transmitted from the power-transmitting device S to the power-receiving device R corresponds to a charging power (or charging current) target value to the battery B and is power (current) that the battery B should be charged with. For example, in a CC charging type, a desired current that should be input to the battery B is present, and thus the battery controller BS sends a value of the desired current to the power-transmitting device S. Then, the power transmission controller E can control the inverter circuit 2 so that the inverter circuit 2 outputs the power which may be required for the desired current to be input to the battery B. The CC charging type is realized in this manner.

INDUSTRIAL APPLICABILITY

According to the present disclosure, the power transmission to the load can be adjusted even if the power-receiving device does not have a function for adjusting the power transmitted to the load.

What is claimed is:

1. A power-transmitting device transmitting AC power generated in an inverter circuit to a power-receiving device in a wireless manner by magnetically coupling a power-transmitting coil to a power-receiving coil of the power-receiving device, the power-transmitting device comprising
a power transmission controller controlling the inverter circuit to change the AC power in accordance with information relating to a state of power transmission to a load connected to the power-receiving device; and
an acquisition unit acquiring the information from the power receiving device.

2. The power-transmitting device according to claim 1, wherein the load is a secondary battery, the acquisition unit acquires, as the information, an instruction to reduce the power transmission to the secondary battery, and the power transmission controller changes the AC power according to the information.

3. The power-transmitting device according to claim 2, wherein the power transmission controller controls the inverter circuit so that a phase difference between the output current and the output voltage of the inverter circuit increases as a charging state of the secondary battery becomes close to a fully-charged state.

4. The power-transmitting device according to claim 1, wherein the load is a secondary battery, and the power transmission controller determines a timing of a reduction in the power transmission to the secondary battery according to the information and changes the AC power based on a result of the determination.

5. The power-transmitting device according to claim 4, wherein the acquisition unit acquires the information once after the transmission of the AC power is initiated, the power-transmitting device comprises a storage unit in which a relationship between a charging time of the secondary battery and the information is stored in advance, and the power transmission controller determines the timing of the reduction in the power transmission to the secondary battery according to the relationship and the information.

6. The power-transmitting device according to claim 5, wherein the storage unit stores a relationship between the charging time and charging power of the secondary battery for each of secondary batteries having different characteristics.

7. The power-transmitting device according to claim 4, wherein the information is a charging voltage or impedance of the secondary battery.

8. The power-transmitting device according to claim 1, wherein the load is a secondary battery, the power-transmitting device comprises a storage unit in which a relationship between impedance of the load and a timing of a change in the AC power is stored, and the power transmission controller identifies the impedance of the load according to an input current and an input voltage of the inverter circuit or an output current and an output voltage of the inverter circuit and changes the AC power according to the identified impedance and the relationship.

9. The power-transmitting device according to claim 1, wherein the power transmission controller adjusts a switching frequency of the inverter circuit.

10. The power-transmitting device according to claim 1, wherein the power transmission controller adjusts an ON/OFF duty ratio of the inverter circuit.

11. The power-transmitting device according to claim 1, wherein the power transmission controller adjusts a switching phase difference between two legs where two switching elements in the inverter circuit are connected in series.

12. A wireless power transmission system comprising:
the power-transmitting device; and
the power receiving device according to claim 1.

13. The wireless power transmission system according to claim 12, wherein the power-receiving device includes a power-receiving rectifier circuit rectifying the AC power received from the power-transmitting coil by the power-receiving coil and transmitting the rectified AC power to the secondary battery as the load, and a provider providing the power-transmitting device with the information relating to the state of the power transmission.

* * * * *